United States Patent

Inaga et al.

[15] 3,688,055

[45] Aug. 29, 1972

[54] GUIDE PLATE FOR USE WITH TAPE RECORD/PLAYBACK MECHANISM

[72] Inventors: Katsu Inaga; Yotaro Miura, both of Tokyo, Japan

[73] Assignee: Sony Corporation, Tokyo, Japan

[22] Filed: Oct. 30, 1970

[21] Appl. No.: 85,491

[30] Foreign Application Priority Data

Jan. 24, 1970 Japan ........................45/6480

[52] U.S. Cl..........179/100.2 Z, 179/100.2 T, 226/91, 274/4 E

[51] Int. Cl..........................G11b 15/66, G11b 23/04

[58] Field of Search.......179/100.2 Z, 100.2 T, 100.2 MD; 226/183, 91, 90, 49; 274/4 D, 4 E

[56] References Cited

UNITED STATES PATENTS

| | | | |
|---|---|---|---|
| 3,512,694 | 5/1970 | Sugaya et al. | 179/100.2 T |
| 3,588,378 | 6/1971 | Protas | 179/100.2 T |
| 3,516,146 | 6/1970 | Maxey | 179/100.2 T |

FOREIGN PATENTS OR APPLICATIONS

| | | | |
|---|---|---|---|
| 1,537,240 | 10/1967 | Germany | 179/100.2 T |

OTHER PUBLICATIONS

IBM Technical Disclosure Bulletin, R. B. Johnson et al. Vol. 9, No. 8, January 1967, page 968.

*Primary Examiner*—Bernard Konick
*Assistant Examiner*—Alfred H. Eddleman
*Attorney*—Lewis H. Eslinger, Alvin Sinderbrand and Curtis, Morris & Safford

[57] ABSTRACT

A guide plate for use with a tape record/playback mechanism which is useful for insuring that a tape loop is properly placed around a drum having magnetic heads therein and an inclined tape guide member. Movable fingers form the tape into a loop and transport it and then drop the tape around the drum and inclined guide. If the tape is prematurely dropped it will not be in contact with the inclined guide. The guide plate will intercept a premature drop and lead the tape around the inclined guide.

6 Claims, 2 Drawing Figures

INVENTOR.
KATSU INAGA
YOTARO MIURA

BY [signature]
ATTORNEYS

INVENTORS
KATSU INAGA
YOTARO MIURA

BY

ATTORNEYS

GUIDE PLATE FOR USE WITH TAPE RECORD/PLAYBACK MECHANISM

Various methods have been suggested in the prior art for placing a magnetic tape in contact with recording and playback heads used in tape recorders and especially video tape recorders. One of the most convenient, reliable and the method requiring no physical touching of the tape by the operator is an automatic method wherein tape guiding fingers automatically handle the tape.

Generally, a tape cassette having a take-up and a supply reel in a housing is positioned on a tape record/playback housing. The tape guiding fingers are placed behind the tape which extends between the take-up and the supply reel. The fingers initially withdraw the tape in a longitudinal direction out of the cassette and then the fingers rotate to form a loop in the tape. The tape loop is led around a rotatable drum and an inclined tape guide spaced therefrom. The fingers then release the tape wherein the tape falls by gravity around the drum and the guide.

It is important that the tape be placed around the inclined guide because the latter guide places the tape into a helical configuration. The magnetic heads located within the rotating drum scan the tape helically and a helical tape configuration is thereby necessary to insure that the best fidelity is obtained. If the tape guiding fingers drop the tape before the tape loop has been brought beyond the outer limit of the inclined guide, the tape will be dropped between the drum and the guide instead of around the drum and around the outside of the guide. If this occurs, the tape will not be formed into a helix and the tape will not be scanned properly by the magnetic heads.

The present invention overcomes the aforementioned drawback by providing a guide plate extending between the rotating drum and the inclined guide. The guide plate is formed to catch the tape if it is released at any position between the drum and the inclined guide. The guide plate is slanted so as to guide the tape to a correct position around the inclined guide.

It is therefore a principal object of the invention to provide a mechanism for insuring the proper placement of a magnetic tape around a guide member.

It is another object of the invention to provide a simple and inexpensive mechanism between a drum and a guide pin to insure the proper placement of a magnetic type.

It is still another object of the invention to provide a guide plate which is smooth and slanted in configuration which conveniently guides a magnetic tape into proper position in the event of a premature drop of the tape.

These and other objects, features and advantages of the invention will become apparent when viewed in the light of the following description, claims and drawings.

Figure 1:
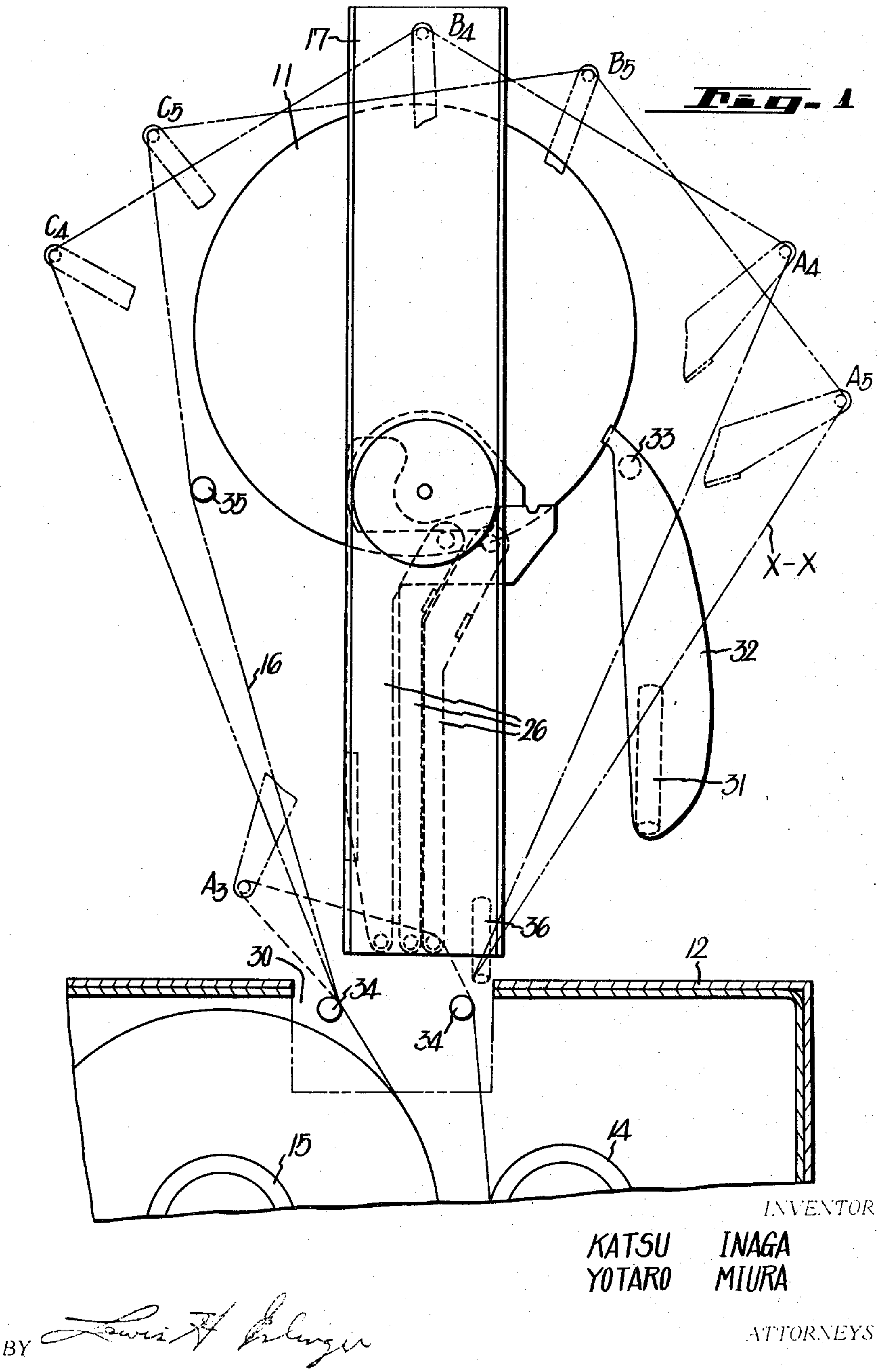
Figure 2:
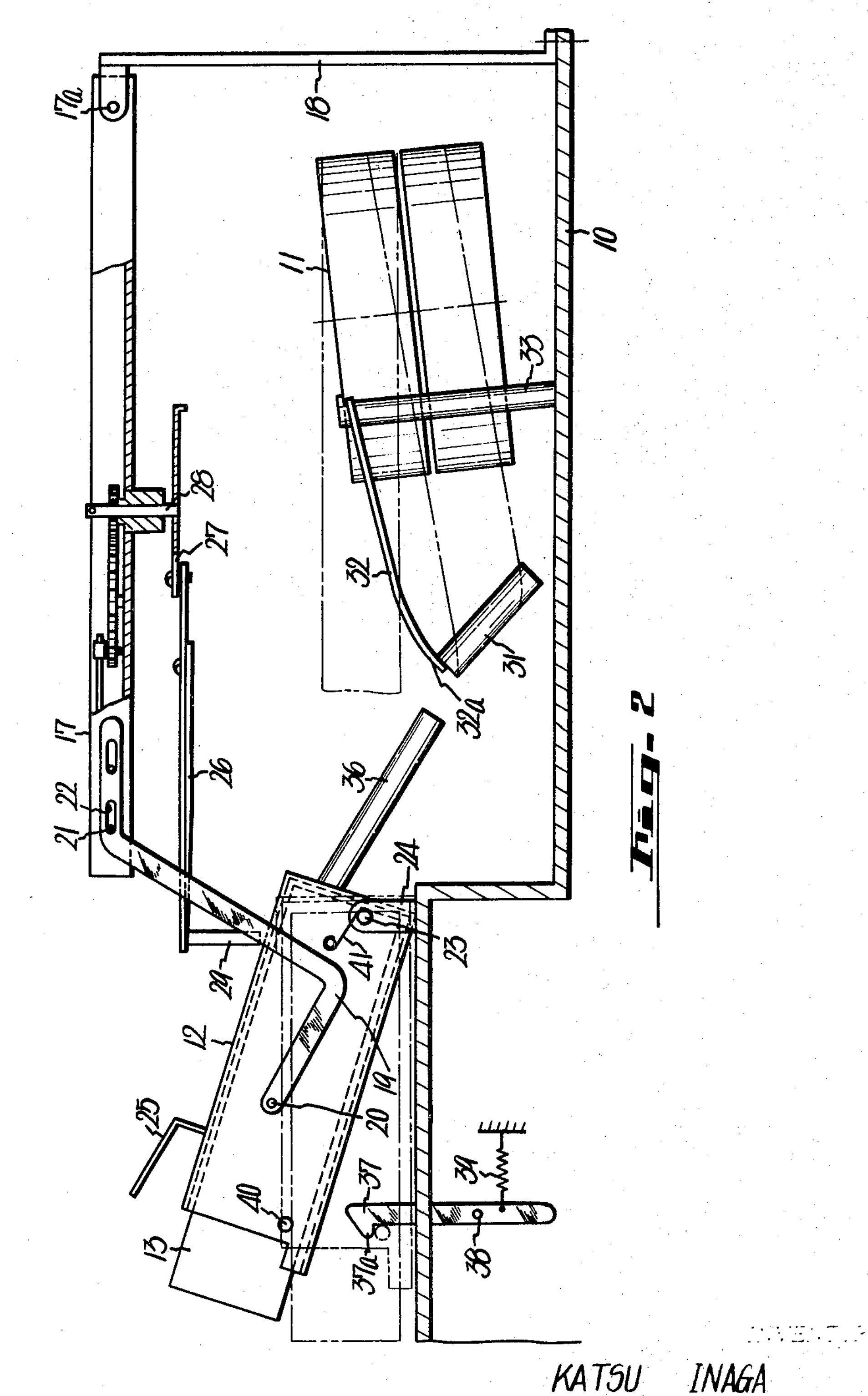

FIG. 1 is a top view showing a guide plate extending between a drum and an inclined guide pin, and FIG. 2 is a side view of the guide plate showing its association with other structural members.

Referring to the drawings, there is shown in FIG. 2, a chassis 10 which serves as a base to hold the operative electronic and mechanical elements comprising a tape recorder. A drum 11 is rotatably mounted on the chassis 10 in any known manner, and the drum which can be formed in two halves has magnetic heads (not shown) fixed to the upper drum half which helically scan a magnetic tape to either apply or receive audio or video signals therefrom.

A pivoted holder 12 is designed to receive a cassette 13 having a supply reel 14 and a take-up reel 15 therein. A magnetic tape 16 is wrapped on the reels in a well-known manner and has a portion thereof which extends between the reels.

A loading plate 17 is pivotally secured to an upstanding wall 18 on the chassis 10 about the axis 17*a*. A lever arm 19 connects the loading plate 17 to the cassette holder 12. The arm 19 is pivotally secured to the holder 12 by means of a pin 20 and pins 21 on the loading plate 17 are located within the elongated slots 22 on the arm 19. The holder 12 is pivotally biased upwardly in a clockwise direction about the pin 23 journalled in a pair of opposed standards 24. Thus, when the cassette holder 12 is moved down by depressing the handle 25, the loading plate 17 is pivoted down also because it is fixed to the arm 19. A plurality of arms 26 are pivotally secured to the loading plate 17 by being attached to a plate 27 which is rotatably secured to a shaft 28 on the loading plate 17. The arms 26 each have a depending finger 29 thereon whereby when the cassette holder 12 and the loading plate 17 are lowered the arms, by virtue of the fact that they are secured to the loading plate 17, are correspondingly lowered. The fingers 29 fit into an opening 30 in the cassette holder 12 and cassette 13 such that the fingers 29 are behind the tape 16. A motor (not shown) causes the arms 27 to move rearwardly to draw the tape 16 out of the cassette 12 and then by means of a gear arrangement (not shown) the arms are forced to rotate in a clockwise direction as viewed in FIG. 1. The tape 16 is moved into the position $A_4$, $B_4$, $C_4$ whereby it is formed into the loop around the drum 11. As the arms 26 continue to rotate, the tape 16 is brought to the position $A_5$, $B_5$, $C_5$ which is larger than the loop $A_4$, $B_4$, $C_4$. Since the loop is larger, it falls off the fingers 29 and drops around the drum 11 and the slanted guide post 31. If the tape 16 falls off the fingers 29 prematurely it falls between the drum 11 and the post 31 as shown by line X–X. If this occurs a guide plate 32 which extends between the drum 11 and the planted guide pin 31 catches the tape X —X. The guide plate 32 is formed with a curvature 32*a* therein as depicted in FIG. 2 such that the curvature leads into the slanted guide pin 31, whereby the tape 16 as it is being wound onto the take-up reel in the cassette 13 is forced to follow the curvature of the guide plate 32 until it is delivered to its proper position around the pin 31. The guide plate can be supported on a post 33 at one end and on the slanted guide pin 31 at the other, or it can be supported in any other convenient manner as long as it extends between the drum 11 and the guide pin 31.

Guide pins 34, 35 and 36 can be used to maintain the tape 16 in a pre-determined configuration. The guide pin 36 can be slanted to help maintain the helical configuration of the tape 16.

A lever 37 which is pivotally mounted on the chassis 10 by a pin 38 is biased in a counter-clockwise direction by a spring 39. The lever 37 has a nose 37*a* thereon which is cammed rearwardly by a protuberance 40. The nose of the lever 37 is then biased over the protuberance 40 by the spring 39 thereby preventing the holder 12 from returning to the raised FIG. 2 position. To again raise the holder 12, the operator merely pivots the lever in a clockwise direction until the nose 37*a* clears the protuberance 40. The spring 41, having one end around the shaft 23 and the other secured to the holder 12 biases the holder in a clockwise direction.

While there has been shown and described a single embodiment of the invention, it will be obvious to those skilled in the art that changes and modifications may be made without departing from the invention, and that it is intended by the appended claims to cover all such changes and modifications as fall within the true spirit and scope of the invention.

What is claimed is:

1. In an apparatus for recording and/or reproducing signals on a magnetic tape; the combination of a chassis, tape supply means containing a supply of the magnetic tape and being positioned on said chassis, a tape guide drum spaced from said tape supply means on the chassis and having at least one rotary magnetic head associated therewith for movement in a circular path corresponding to the circumference of said drum, tape guiding means for pulling out the tape from said tape supply means and forming the pulled-out tape into a loop that is disposed above the guide drum and that encompasses and is spaced outwardly from said drum, and for releasing the tape loop from said tape guiding means so that the tape loop drops therefrom about said drum to engage the surface of the tape at the inside of said loop with at least a portion of said circumference of the guide drum, at least one tape guidepost spaced from said drum and engageable by the tape when the latter is released from said tape guiding means for determining an angle formed between the tape engaged with said portion of the drum circumference and the plane of said circular path in which said head moves, and means for leading said tape loop about said guidepost when the tape loop drops from said tape guiding means.

2. An apparatus according to claim 1, in which said means for leading the tape loop about said guidepost includes a guide member having a curved portion extending downwardly from a point adjacent said drum to a point directly above said guidepost.

3. An apparatus according to claim 1 in which said means for leading the tape loop about said guidepost includes a guide member having one end secured to an upstanding member adjacent said drum and the other end of said guide member is secured to the upper end of said guidepost.

4. An apparatus according to claim 1, in which said tape supply means is positioned on said chassis at a level substantially corresponding to an upper of said drum, and said tape guidepost is disposed below said level of the tape supply means between the latter and said drum and is slanted from the vertical in the direction extending upwardly away from said drum.

5. An apparatus according to claim 1, in which said tape supply means is a cassette containing reels on which the tape is wound, and a holder is mounted on said chassis for receiving and positioning said cassette.

6. An apparatus according to claim 5, in which said tape guiding means includes a plurality of fingers extendable into an opening of said cassette received by said holder and being movable out of said cassette opening in a substantially planar path that is disposed above said guide drum and has an arcuate section extending around at least said portion of the circumference of said drum.

* * * * *